United States Patent

[11] 3,604,110

[72] Inventor Russell E. Jerolamon
Detroit, Mich.
[21] Appl. No. 793,263
[22] Filed Jan. 23, 1969
[45] Patented Sept. 14, 1971
[73] Assignee Burroughs Corporation
Detroit, Mich.

[54] METHOD OF MAKING AN ELECTRICAL TERMINAL BOARD ASSEMBLY
5 Claims, 5 Drawing Figs.

[52] U.S. Cl. .......... 29/626, 156/293, 156/252
[51] Int. Cl. .......... H05k 3/30
[50] Field of Search .......... 29/625, 626, 627, 628, 630; 339/60, 61, 198, 218; 156/293, 252, 261

[56] References Cited
UNITED STATES PATENTS
2,651,833 9/1953 Kernahan .......... 29/630 D
FOREIGN PATENTS
1,166,867 4/1964 Germany .......... 356/339

*Primary Examiner*—John F. Campbell
*Assistant Examiner*—D. M. Heist
*Attorneys*—Paul W. Fish and Edwin W. Vren

ABSTRACT: A method of forming a terminal board assembly which comprises the steps of inserting the anchoring parts or pins of electrical accessories or components into holes opening out on one side of an apertured board composed of electrical insulating material and so dimensioned that the inserted ends of the pins are projected beyond the opposite side of the board. Placing a thin imperforate sheet of thermosetting plastic material in juxtaposition to the side of the apertured board from which the pins project. Then applying pressure compressing the plastic sheet against the adjacent side of the board thereby causing the projecting ends of the pins to punch out apertures in the plastic sheet corresponding in size and in registration with the apparatus of the board. Thereafter, subjecting the assembly to a high-temperature environment which first causes the plastic material of the sheet to liquify and flow into the annular spaces between the component pins and the walls of the holes into which they are inserted and then later causes this plastic material to polymerize or harden therein, thereby firmly securing the pins and their associated components to the insulating board.

PATENTED SEP 14 1971 3,604,110
FIG. 1.
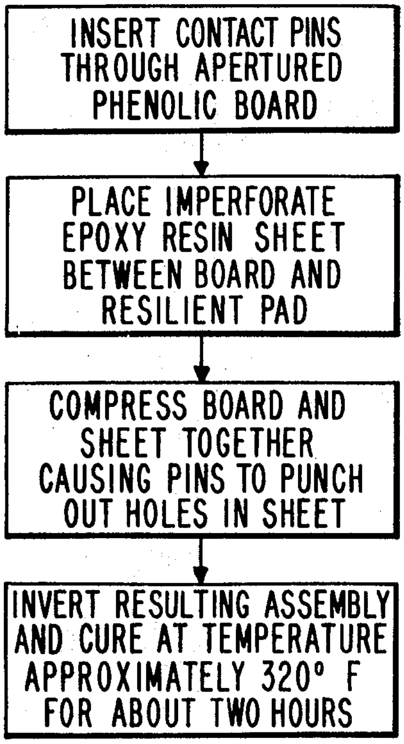
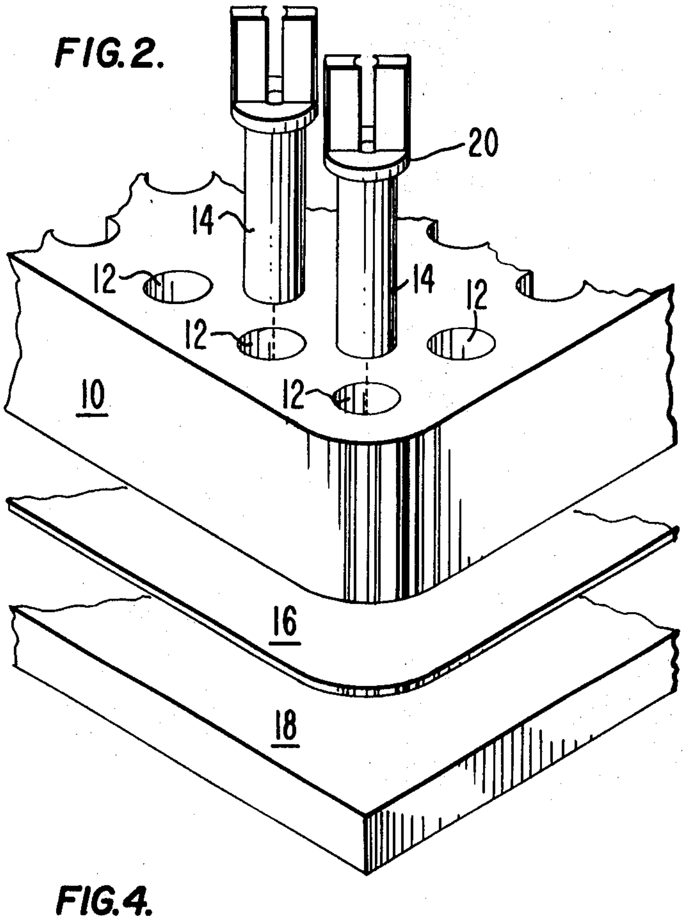
FIG. 3.
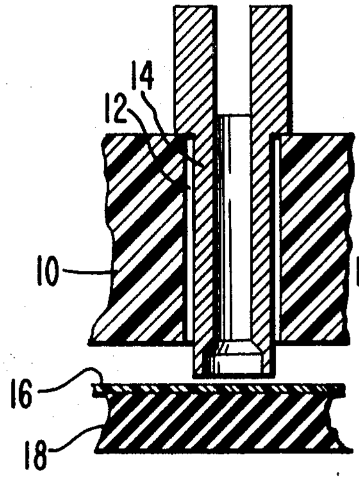
FIG. 4.
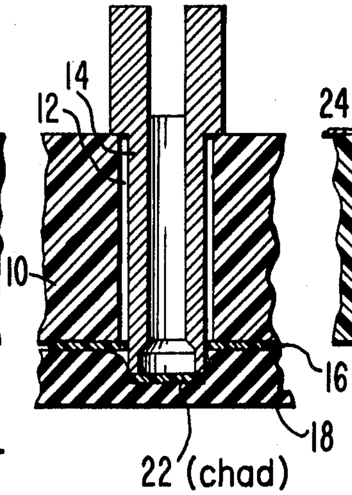
FIG. 5.
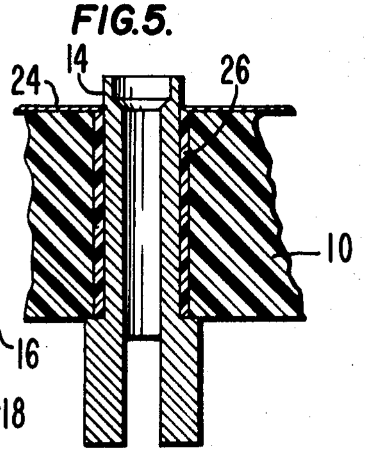
INVENTOR.
RUSSELL E. JEROLAMON.
BY
Raymond B. Parker
ATTORNEY.

METHOD OF MAKING AN ELECTRICAL TERMINAL BOARD ASSEMBLY

CROSS-REFERENCE

This invention relates to the invention disclosed and claimed in the copending application for patent of Frank Dedek, Ser. No. 667,722, filed Sept. 14, 1967, now U.S. Pat. No. 3,536,565 which is of common ownership herewith.

BACKGROUND OF THE INVENTION

The present invention is an improvement over the method disclosed in the aforesaid patent. In the practice of the method disclosed in that patent, a preapertured board and a separate dry, preapertured film or sheet of plastic bonding material, such as epoxy resin, were employed. The holes formed in the plastic sheet were registrable with those of the board and the sheet was mounted on the board in such registered condition. With the resin sheet in registration on the board, pins of accessory elements or components were inserted therethrough. Subsequently, the assembly was subjected to a relatively high-temperature environment which caused the epoxy material of the overlying sheet to liquify and flow into the holes and particularly into the annular spaces between the pins and the walls of the holes. Upon further application of this heat, this plastic epoxy material hardened and formed a permanent bond between the pins and the board.

Although this method of bonding electrical elements to a terminal board was a considerable improvement over prior art efforts, it did require the provision of a die of a particularly design for punching out the plastic epoxy sheet with holes which would be comparable in size with those in the board and register therewith and then mounting the plastic sheet upon the board with their respective holes in registration with one another before the contact elements of the electrical components were inserted into the holes. A different die had to be designed for each size and spatial arrangement of the holes and the time as well as the cost of this manufacturing operation detracted from an otherwise highly expedient method of assembling and bonding electrical components to a board.

SUMMARY OF THE INVENTION

The invention is directed to method of making terminal board assemblies which comprises the steps of taking a substrate in the form of a phenolic board, the board having apertures therein and opening out through the opposite surfaces thereof and preferably arranged in a matrix. Electrical accessories are now mounted on the board by having their contact pins inserted through the holes of the board, the pins being so dimensioned with respect to the board that when fully inserted they project beyond the opposite side of the board. Thus assembled, the projecting ends of the pins in the board are forced against and punch out holes in an imperforate plastic sheet containing a thermosetting bonding substance, thereby utilizing the very elements to be bonded as die media for perforating the plastic sheet. Thereafter, the now completed assembly is turned so that the plastic bonding sheet is above the board and in this position it is then subjected to a high-temperature environment higher than the thermosetting temperature of the plastic sheet but below that of the board which causes the plastic bonding material of the sheet to melt and flow into the holes and around the pins. Further application of heat causes the bonding material to harden or polymerize providing a permanent bond to form between the contact pins and the phenolic board. The improved method avoids the necessity and expense of preparing special dies for punching out the holes in the plastic bonding sheet.

Accordingly, an important object of this invention is to provide an improved method of bonding electrical accessories to a terminal board.

Another important object of the present invention is to provide an improved method of bonding circuit elements to a terminal board which is extremely simple and inexpensive to perform and which lends itself to mass production. A further important object of this invention is to reduce manufacturing costs by utilizing the very elements to be bonded as instrumentalities for performing a perforating or die cutting operation on the bonding material.

The above-listed objects and other aspects of the invention will be further explained in the following detailed description. For a more complete understanding of the invention reference may be had to the following detailed description in conjunction with the drawings.

BRIEF DESCRIPTION OF THE DRAWINGS

FIG. 1 is a flow chart depicting the process for manufacturing the terminal board assembly in accordance with the invention;

FIG. 2 is an exploded view of the components of a terminal board assembly according to the invention; and FIGS. 3, 4, and 5 are enlarged sectional views through a terminal board assembly showing progressive steps in the practice of this invention.

DESCRIPTION OF A PREFERRED EMBODIMENT

Referring to FIG. 1, the flow chart depicts the method of manufacturing the terminal board assembly in accordance with the present invention. An apertured mounting panel or board 10, usually of phenolic material, is provided with a matrix of holes 12 which are of size to accommodate electrical contact or terminal pins 14. The pins are preferably so dimensioned with respect to the board and the holes therein as to project from the opposite side of the board when fully inserted and to provide a very slight clearance therearound when centered in the hole. After the contact pins are fully inserted in the apertured board, a thin, dry imperforate sheet 16 of plastic bonding material, such as epoxy resin, is placed under the board and between the same and a resilient pad 18. The board and sheet are compressed together against the resilient pad causing the projecting ends of the pins to pierce the sheet and punch out holes therein in exact registration with the holes in the board. Thereafter, the compressed assembly is separated from the pad and inverted so that the epoxy resin sheet 16 is now laying on the upper surface of the board, and in so doing the punched out portions or chads of the sheet are left on the resilient pad. The assembly is then cured in an oven which, for epoxy resin, may be at approximately 320° F. for a period of approximately 2 hours. This latter step first causes the epoxy resin of the sheet 16 to liquify and flow into the holes and between the walls thereof and the contact pins 14 and then later during this curing period to harden or take a permanent set therein with the result that the contact pins are fully bonded and anchored to the board. The assembly is then withdrawn from the oven and is ready for use.

Referring now to FIG. 2, which shows the processes of FIG. 1 in more detail, an exploded assembly of the parts shows the contact pins 14 arranged in line with the holes 12 in the phenolic board 10 and further shows a thin unapertured epoxy resin sheet 16 interposed between the board 10 and a resilient pad 18.

The sheet 16 preferably consists of an epoxy resin with a paper base, although sheets of other thermosetting and base materials may be used. The sheet 16 is also preferably in the partially cured condition, the sheet being dry and solid. The sheet 16 may vary in thickness from approximately 0.003 to 0.020 inch. The amount of bonding material to be used can be controlled by adjusting the thickness of the sheet. An epoxy resin impregnated sheet having a paper base which may be used to practice the invention is the Filmex 802 Series, which is manufactured by the Mansol Ceramics Co. of Belleville, N.J. This epoxy resin sheet with its paper base was selected so that the curing cycle would occur at 320° F. for a period of 2 hours. Contrary to the invention described in the aforesaid patent to Frank Dedek, the sheet 16 is imperforate, there being no need in the practice of the present invention to prepare a die and die-cut the holes therein corresponding dimensionally and spatially to the holes 12 of the phenolic board 10.

The method of the present invention proceeds in the following manner. The contact pins 14, which may be brass and hollow, are inserted into the holes 12 of the phenolic board 10 and to the extent that the inserted ends of the boards project slightly beyond the opposite side of the board as illustrated in FIGS. 3, 4 and 5. The contact pins are herein shown having shoulder portions 20 larger than the holes which serve to abut the board and to limit the distance they may be inserted into the holes. The uninserted balance of the contact pins may be of any suitable construction shown for receiving electrical terminals for connection thereto.

As shown in the progressive views of FIG. 3, 4 and 5, the resilient pad or cushion 18 yields to the forces exerted by the pins against the imperforate plastic sheet 16 causing the projected end of each pin to cut through or punch out a circular portion conforming in size to the external dimension of the end of the pin. FIG. 3 shows the position of the parts just prior to the punch-out operation, while FIG. 4 shows the conclusion of the punch-out operation where the circular chads 22 are shown severed from the sheet 16 and pressed into the resilient pad 18 below the plane of the pad.

When the resilient pad 18 is separated from the assembly shown in FIG. 4, the chads 22 remain with the pad and may be air blown therefrom or otherwise discarded. The assembly of the board 10 and the sheet 12 with the pins 14 inserted therethrough is now inverted and assumes the position shown in FIG. 5 where the plastic sheet 16 now lies on the upper surface board 10. The assembly in this position is then subjected to a high-temperature environment at approximately 320° F. for a period of approximately 2 hours. The amount and duration of the heat applied will depend on the nature of the bonding material in the sheet 16. Initially, the bonding material, epoxy resin in the specific example, will flow into the annular space between the contact pins and the walls of the holes 12. As the assembly is further cured in this temperature environment, the epoxy resin will harden and make a permanent bond between the contact pins 14 and the board 10. The heat environment does not affect the phenolic board 10 as its curing temperature is established at a higher level such as approximately 375° F. Any paper base residue of the plastic sheet 16 will usually remain on the surface of the phenolic board as indicated at 24 and may be left thereon if so desired.

Referring again to FIG. 5, there is shown a sectional view through the terminal board assembly after the process has been completed. The contact pins 14 are shown bonded to board 10 by means of the epoxy resin 26, which first flowed into the annular spaces between the pins and the walls of the holes 12 and was then polymerized. By proper selection of the composition and thickness of the plastic sheet 16, nearly all of the bonding material thereof flows into the annular spaces, leaving the sheet base as residue 24 on the surface of the board 10.

The utilization of the pins 14 to punch out holes in the very medium which is to serve the purpose of bonding the pins to the phenolic board 10 eliminates the need for providing an already-perforated plastic bonding sheet described in the aforesaid patent and the further need and cost of a die capable of forming holes in such a sheet which will register with the holes in the board 10. Any change in the diameters or spatial arrangement of the holes would require a new die.

The employment of a separate dry sheet 16 of bonding material enables the parts to be assembled and secured together in one heat treating operation. This avoids the problem of accidentally introducing bonding material into the holes before the pins are inserted therein and thereby result in the formation of an insulative film on parts of the pins, such as the projecting ends thereof, when the assembly is subjected to curing temperatures. The bonding material represented by the sheet 16, which provides the eventual adhesive fastening, is completely dry at the time the pins 14 are punched therethrough. In the process described herein none of the bonding material enters the holes before the pins are inserted into the board. However, during the heat treatment at temperatures above the cure temperature of the bonding material of the sheet 16 but below the polymerizing temperature of the mounting board 10 the bonding material of the sheet will flow on the upper surface of the board and by gravity into the holes around the pins, and upon continued application of heat at this temperature level the sheet material now in a liquid state in the holes will harden and bond the pins to the board. This considerably shortens the time and reduces the cost of mounting accessory elements and components in printed circuit panel boards and likewise eliminates the necessity of making special dies for punching perforations in the plastic sheet containing the bonding material.

It is to be understood that the foregoing explanation is by way of illustration only. As would be evident to those skilled in the art the invention may be adapted to utilize impregnated sheets of various shapes and compositions of plastic, to bond other types of electrical components to the phenolic board, and to vary the curing temperatures and times.

What is claimed is:

1. The method of making an electrical board assembly comprising the steps of:

providing an apertured mounting board formed at least in part of thermosetting material and having the holes thereof opening out through the opposite sides of the board, inserting component elements into the holes of the board from one side thereof which are so dimensioned with respect to the holes into which they are inserted as to provide a slight annular clearance therearound when centered in the holes and further so that the entering ends of the elements project from the opposite side of the board, bringing a thin imperforate dry sheet formed at least in part of thermosetting material into juxtaposition to the side of the board from which the inserted ends of the component elements project, the thermosetting material of the sheet having a setting temperature below that of the thermosetting material of the board, compressing the board and sheet together to cause the projecting ends of the component elements to pierce the sheet and punch out holes therein registering with the holes in the board, subjecting the assembly of the punched out sheet and the board with the component elements mounted therein to a heat environment which is above the thermosetting temperature of the sheet but below that of the thermosetting material of the board for a period of time sufficient to cause the thermosetting material of the sheet to liquify and flow into the holes and between the walls thereof and the inserted portions of the component elements, and continuing the subjection of the assembly to said heat environment for a period of time sufficient to cause the thermosetting material of the sheet which has flowed into the holes of the board to take a permanent set and thereby bond the component elements to the board.

2. The method of bonding component elements to a board comprising the steps of:

inserting a component element in each hole of a mounting board so that ends of the elements project from one side of the board, bringing a thin imperforate sheet containing thermosetting material into juxtaposition to the side of the board from which the ends of the component elements project, compressing the board and sheet together to cause the projecting ends of the component elements to pierce the sheet and bring the sheet into surface contact with the adjacent side of the board, subjecting the assembly of the pierced sheet and the board with the component elements inserted therein to a heat environment which is above the thermosetting temperature of the sheet to cause the thermosetting material of the sheet to liquify and flow into the holes of the board and around the inserted portions of the component elements, and continuing the heat environment for a further period of time sufficient to cause the thermosetting material of the sheet which has flowed into the holes of the board to take a permanent set and bond the component elements to the board.

3. The method of claim 2 characterized in that during the sheet-piercing step the mounting board is superposed thereabove, and that the assembly is inverted and the sheet assumes the upper position with respect to the board when the assembly is subjected to said heat environment.

4. The method of claim 2 characterized in that portions of the sheet pierced by the projecting ends of the component elements are completely punched out of the sheet.

5. The method of making an electrical terminal board assembly comprising the steps of:

bringing a thin imperforate sheet formed at least in part of thermosetting material into juxtaposition with one side of a mounting board having holes therein and also formed at least in part of thermosetting material, the thermosetting material of the sheet having a setting temperature below that of the thermosetting material of the board, inserting terminal elements in the holes of the board which are dimensionally shaped with respect to the holes as to provide a slight clearance between the elements and the walls of the holes and so that the inserted ends thereof project slightly from the side thereof adjacent to the sheet, compressing the board and sheet together to cause the projecting ends of the terminal elements to pierce the sheet and punch out holes therein registering with the holes in the board, subjecting the assembly of the punched out sheet and the board with the terminal elements inserted therein to a heat environment which is above the thermosetting temperature of the sheet but below that of the thermosetting material of the board for a period of time sufficient to cause the thermosetting material of the sheet to liquify and flow into the holes of the board around the inserted portions of the terminal elements, and continuing the subjection of the assembly to said heat environment for a period of time sufficient to cause the thermosetting material of the sheet which has flowed into the holes of the board to take a permanent set and thereby bond the terminal elements to the board.